(12) United States Patent
Kusumoto et al.

(10) Patent No.: US 6,295,262 B1
(45) Date of Patent: Sep. 25, 2001

(54) METHOD AND APPARATUS FOR RECORDING INFORMATION ONTO OPTICAL DISK

(75) Inventors: Shoji Kusumoto, Osaka; Satoshi Tanaka, Higashiosaka; Seiji Tanaka, Tonami; Mitsuaki Oshima, Kyoto, all of (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/057,467

(22) Filed: Apr. 9, 1998

(30) Foreign Application Priority Data

Apr. 10, 1997 (JP) .................................................. 9-091931

(51) Int. Cl.⁷ .................................................. G11B 27/36
(52) U.S. Cl. .................................. 369/53.37; 369/53.31; 369/53.2; 235/462.25
(58) Field of Search ................................. 369/52, 54, 47, 369/48, 84, 53.22, 53.31, 53.37; 360/31; 900/108–110, 115–116

(56) References Cited

U.S. PATENT DOCUMENTS

| | | | |
|---|---|---|---|
| 4,677,604 | * | 6/1987 | Selby, III et al. .................. 369/52 X |
| 5,400,319 | * | 3/1995 | Fite et al. ........................... 369/275.5 |
| 5,430,281 | * | 7/1995 | Lentz et al. ........................... 235/454 |
| 5,438,674 | * | 8/1999 | Keele et al. ........................... 395/404 |
| 5,457,674 | * | 10/1995 | Watanabe et al. ...................... 369/54 |
| 5,489,768 | * | 2/1996 | Brownstein et al. ................. 235/414 |
| 5,518,325 | * | 5/1996 | Kahle ................................. 369/84 X |
| 5,818,812 | * | 10/1998 | Moribe et al. ...................... 369/54 X |
| 5,856,964 | * | 1/1999 | Shtipelman et al. .................... 369/54 |
| 5,940,854 | * | 8/1999 | Green, Jr. et al. ..................... 711/112 |
| 6,052,465 | * | 4/2000 | Gotoh et al. ............................. 380/4 |

FOREIGN PATENT DOCUMENTS

| | | |
|---|---|---|
| 57-94482 | 6/1982 | (JP) . |
| 9-7288 | 1/1997 | (JP) . |
| 9-50649 | 2/1997 | (JP) . |

OTHER PUBLICATIONS

National Technical Report, vol. 43, No. 3, pp. 70–77, Jun. 1997, Mitsuaki Oshima et al., "Recording Method to Add Unique Information on ROM Disc of DVD BCA (Burst Cutting Area)".

* cited by examiner

*Primary Examiner*—Aristotelis M. Psitos
(74) *Attorney, Agent, or Firm*—Wenderoth Lind & Ponack L.L.P.

(57) ABSTRACT

A method for recording, onto an optical disk, individual information different from optical disk to optical disk, which includes obtaining individual information to be recorded onto an optical disk, writing a bar code corresponding to the individual information into a recording layer within the optical disk with laser beam, reading the individual information of the bar code written in the write process, and comparing the individual information read in the read process with the individual information to be written, wherein if two articles of individual information are coincident with each other, processing on the optical disk is completed and the information obtaining process and the write, read, and compare processes are iterated on a new optical disk, and if the two articles of individual information are different from each other, the current write, read, and compare process are iterated on a new optical disk.

4 Claims, 6 Drawing Sheets

METHOD AND APPARATUS FOR RECORDING INFORMATION ONTO OPTICAL DISK

BACKGROUND OF THE INVENTION

The present invention relates to method and apparatus for recording information onto an optical disk. More specifically, the invention relates to a method for recording, on individual optical disks, individual information different from disk to disk.

A read only optical disk such as a DVD (Digital Video Disk) has a synthetic resin substrate on which a pattern of pits and projections, or a so-called pit pattern, corresponding to recorded information is formed, and a recording layer which is formed of a metallic thin layer of gold, aluminum or the like so as to cover the pit pattern of the substrate. The pattern of pits and projections of the recording layer is read by a laser beam, by which information such as image, audio, and character data is obtained.

For the formation of the pit pattern on the synthetic resin substrate, a pit pattern is transferred and formed onto the synthetic resin substrate from a metal master disk or the like on which the pit pattern has previously been formed. Therefore, from one master disk, optical disks on which exactly the same information is recorded are produced efficiently. Generally, read only optical disks, once produced, do not allow any additional information to be written.

Meanwhile, in terms of management for production and storage or distribution and marketing of optical disks, there are some cases where serial numbers or identification codes are attached to individual optical disks.

Thus, there has been proposed a technique that individual information differing from optical disk to optical disk, such as serial numbers or identification codes, is additionally written by writing bar codes on produced optical disks with a laser beam. In the Japanese Patent Application No. 8-8910 that the present inventor has previously filed for patent, is disclosed a technique for reading individual information of a bar code through processes of applying a laser beam to the recording layer inside the optical disk to melt and remove the metallic thin film that forms the recording layer into the bar code pattern, and reading differences in reflection characteristics between the removed portion and its surrounding recording layer by a laser beam different from the above laser beam for writing.

With the adoption of such a method for additionally writing information with bar codes, any arbitrary information can be additionally written with ease afterwards onto optical disks produced by the same manufacturing process as the conventional. The added information can be read easily only by adding a simple circuit to an ordinary player. As a result, it becomes possible to implement customer management, illegal copy prevention and the like securely and efficiently by utilizing the serial numbers or identification codes. Moreover, because once written bar codes cannot be rewritten afterwards, information alteration can be prevented.

However, with the above-described method of additionally writing bar codes, there may occur optical disks from which bar codes can hardly be read or optical disks for which erroneous information is read, that is, defective products. Since a bar code comprising an array of minute linear patterns is written by melting with a laser beam the metallic thin film that forms the recording layer within the optical disk, there arise some cases where the bar code is partly missing or adjacent bar codes join together so that bar codes of correct shape are not made.

Defective products of optical disks that are generated in the process of additionally writing the bar codes are usually discarded. In such a case, individual information written in the defective optical disks is also discarded. For example, in the case where serial numbers are additionally written in optical disks, if optical disks having particular serial numbers are discarded, the serial numbers would be unused numbers. In product management using serial numbers, the presence of unused numbers somewhere in a the sequence would cause great trouble in the management. Without continuous management of information regarding about unused numbers, it would be difficult to determine whether later occurrence of an unused number in the serial numbers is due to the marketing and distribution or the manufacturing process. Also, a need of an optical disk having a particular identification code, if the particular identification code is absent, the need could not be fulfilled.

SUMMARY OF THE INVENTION

An object of the present invention is therefore to make it possible to easily correct omissions of information due to occurrences of defective products, thus allowing an effective use of the convenience of information recording by bar code, in the technique for recording information onto optical disks by using bar codes as described above.

In accomplishing these and other aspects, according to a first aspect of the present invention, there is provided a method for recording, onto an optical disk, individual information different from optical disk to optical disk, the method comprising:
 (a) obtaining individual information to be recorded onto an optical disk;
 (b) writing a bar code corresponding to the individual information into a recording layer within the optical disk with laser beam;
 (c) reading the individual information of the bar code written in the write process (b); and
 (d) comparing the individual information read in the read process (c) with the individual information to be written, wherein if two articles of individual information are coincident with each other, processing on the optical disk is completed and the information obtaining process (a) and the following processes (b), (c), and (d) are iterated on a new optical disk, and if the two articles of individual information are different from each other, the write process (b) and the following processes (c) and (d) are iterated on a new optical disk.

According to a second aspect of the present invention, there is provided the method for recording information onto an optical disk according to the first aspect, wherein the write process (b), the read process (c) and the comparison process (d) are performed while the optical disk is held rotating, and in the comparison process (d), at a time point when the read individual information and the individual information to be written are different from each other, the write process (b) is stopped on the same optical disk, and the write process (b) and the following processes (c) and (d) are iterated on a new optical disk.

According to a third aspect of the present invention, there is provided the method for recording information onto an optical disk according to the second aspect, wherein the write process (b), the read process (c) and the comparison process (d) are performed on the one optical disk while the same optical disk is held rotating and while the read process (c) and the comparison process (d) are performed during the write process (b), and in the comparison process (d), at a time point when the read individual information and the individual information to be written are different from each other, the write process (b) is stopped on the same optical disk, and the write process (b) and the following processes (c) and (d) are iterated on a new optical disk.

According to a fourth aspect of the present invention, there is provided the method for recording information onto an optical disk according to the first aspect, wherein the individual information is one of a serial number and an identification code given by consecutive numbers or combinations of codes assigned to individual optical disks, and otherwise, any arbitrary information as required, such as a type and recording system of information previously recorded on optical disks, cryptographic information for prevention of illegal copy, a date of manufacture, a term of validity for use, and the like, which is used singly or in combination of some plurality.

According to a fifth aspect of the present invention, there is provided the method for recording information onto an optical disk according to the first aspect, further comprising, prior to the write process (b),:

acquiring common information from the optical disk to be written, the common information being common on plural optical disks; and deciding whether or not the individual information is written on the same optical disk in the write process (b) based on the acquired common information.

According to a sixth aspect of the present invention, there is provided the method for recording information onto an optical disk according to the fifth aspect, wherein the common information is information about the optical disk to be acquired is one that can be utilized in the processes (b), (c), and (d), which is information needed to be known before the recording of the bar code, out of such information as whether or not the optical disk is of single layer recording or multiple layer recording, differences In information recording system, production lot number, date of production, and other information to be determined at the time point of production.

According to a seventh aspect of the present invention, there is provided the method for recording information onto an optical disk according to the first aspect, wherein the write process (b) comprising:

generating laser beam unit pulses of equal intervals;

generating an information pulse train by passing and interrupting the laser beam unit pulses of equal intervals at intervals corresponding to the bar code of the individual information; and writing the bar code into the recording layer by applying the information pulse train to the optical disk.

According to an eighth aspect of the present invention, there is provided the method for recording information onto an optical disk according to the first aspect, wherein in the read process (c), the bar code is read at a plurality of places lengthwise of bars constituting the bar code, and in the comparison process (d), the individual information read at the plurality of places and the individual information to be written are compared with each other.

According to a ninth aspect of the present invention, there is provided an apparatus for recording, onto an optical disk, individual information different from optical disk to optical disk, the apparatus comprising:

an information output section for sequentially outputting, to individual optical disks, individual information different from optical disk to optical disk;

a bar code write device for writing a bar code corresponding to the individual information outputted front the information output section into a recording layer within the optical disk with laser beam;

a bar code read device for reading the written individual information of the bar code; and an information comparison section for comparing the individual information read by the bar code read device with the individual information outputted from the information output section.

According to a tenth aspect of the present invention, there is provided the apparatus for recording information onto an optical disk according to the ninth aspect, further comprising a rotation holding device for rotating while holding the optical disk, wherein the write device and the read device are placed above the rotation holding device so as to write and read the information on the optical disk rotating by the rotation holding device.

According to an eleventh aspect of the present invention, there is provided the apparatus for recording information onto an optical disk according to the ninth aspect, further comprising:

a disk information acquisition device for acquiring common information from the optical disk to be written, the common information being common on plural optical disks before the write of a bar code; and a disk information deciding section for deciding whether or not the individual information is written on the same optical disk in the write process (b) based on the acquired common information.

According to a twelfth aspect of the present invention, there is provided the apparatus for recording information onto an optical disk according to the tenth aspect, further comprising:

a disk information aquisition device for acquiring common information from the optical disk to be written, the common information being common on plural optical disks before the writing of a bar code; and a disk information deciding section for deciding whether or not the individual information is written on the same optical disk in the write process (b) based on the acquired common information.

According to a 13th aspect of the present invention, there is provided the apparatus for recording information onto an optical disk according to the ninth aspect, wherein the write device comprises a laser oscillator for generating laser beam unit pulses of equal intervals, and for generating an information pulse train by passing and interrupting the laser beam unit pulses of equal intervals at intervals corresponding to the bar code of the individual information.

According to a 14th aspect of the present invention, there is provided the apparatus for recording information onto an optical disk according to the ninth aspect, wherein the reads device read bar code read areas set to a plurality of places lengthwise of bars constituting the bar code.

According to a 15th aspect of the present invention, there is provided the method for recording information onto an optical disk according to the ninth aspect, wherein the individual information is one of a serial number and an identification code given by consecutive numbers or combinations of codes assigned to individual optical disks, and otherwise, any arbitrary information as required, such as a type and recording system of information previously recorded on optical disks, cryptographic information for prevention of illegal copy, a date of manufacture, a term of validity for use, and the like, which is used singly or in combination of some plurality.

According to a 16th aspect of the present invention, there is provided the method for recording information onto an optical disk according to the 11th aspect, wherein the common information is information about the optical disk to be acquired is one that can be utilized in the processes (b), (c), and (d), which is information needed to be known before the recording of the bar code, out of such information as whether or not the optical disk is of single layer recording or multiple layer recording, differences in information recording system, production lot number, date of production, and other information to be determined at the time point of production.

According to a 17th aspect of the present invention, there is provided the method for recording information onto an optical disk according to the first aspect, wherein the write process (b), the read process (c) and the comparison process (d) are performed on the one optical disk while the same optical disk is held rotating and while the read process (c) and the comparison process (d) are performed during the write process (b), and in the comparison process (d), at a time point when the read individual information and the individual information to be written are different from each other, the write process (b) is stopped on the same optical disk, and the write process (b) and the following processes (c) and (d) are iterated on a new optical disk, further comprising, prior to the write process (b),:

acquiring common information from the optical disk to be written, the common information being common on plural optical disks; and deciding whether or not the individual information is written on the same optical disk in the write process (b) based on the acquired common information.

BRIEF DESCRIPTION OF THE DRAWINGS

These and other aspects and features of the present invention will become clear from the following description taken in conjunction with the preferred embodiments thereof with reference to the accompanying drawings, in which.

DETAILED DESCRIPTION OF THE PREFERRED EMBODIMENTS

Figure 1:
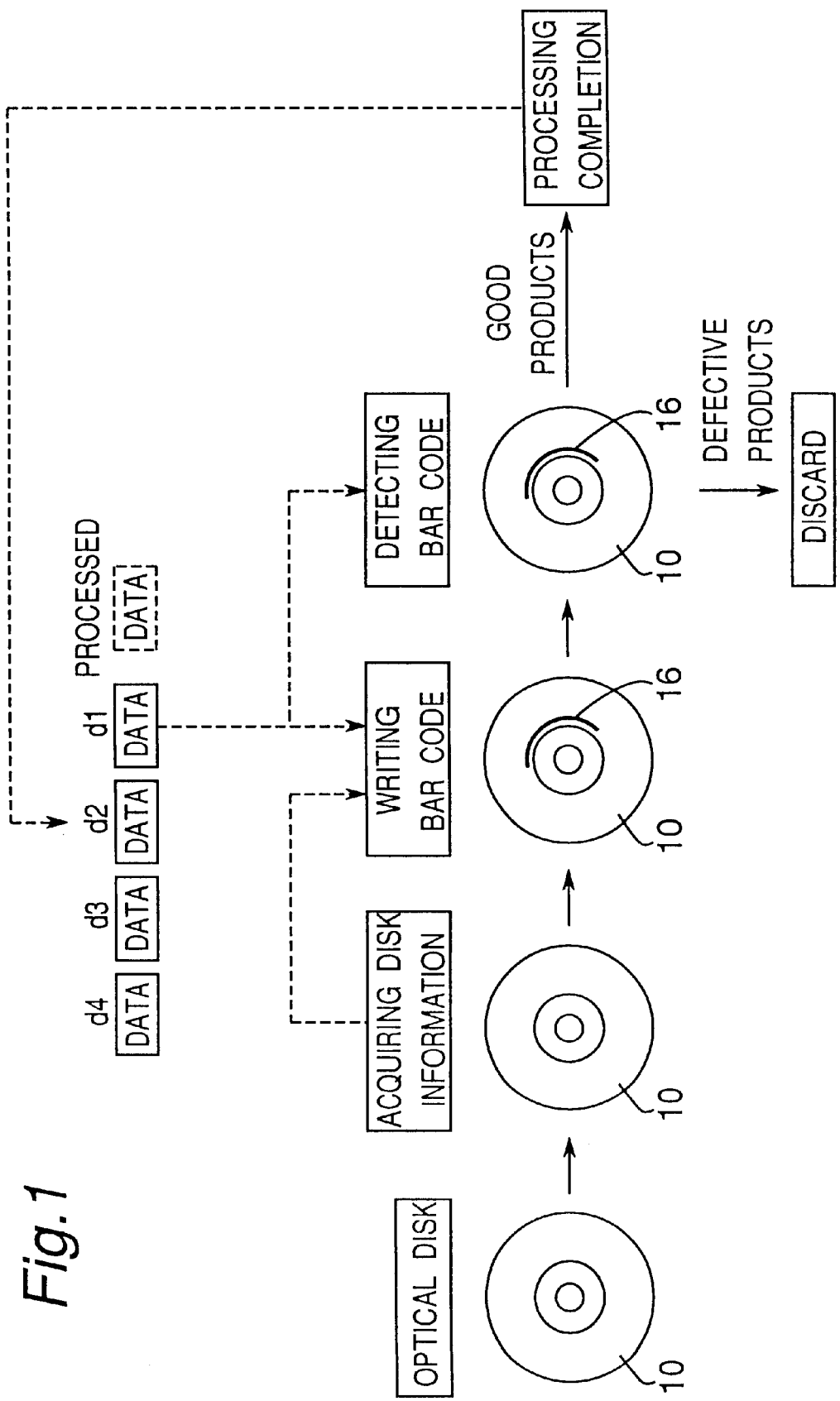
FIG. 1 is a block diagram for explaining the working processes, representing an embodiment of the invention.

Before the description of the present invention proceeds, it is to be noted that like parts are designated by like reference numerals throughout the accompanying drawings.

In an embodiment of the present invention, a method for recording, onto an optical disk, individual information different from optical disk to optical disk, the method comprising:

(a) obtaining individual information to be recorded onto an optical disk;
(b) writing a bar code corresponding to the individual information into a recording layer within the optical disk with laser beam;
(c) reading the individual information of the bar code written in the write process (b); and
(d) comparing the individual information read in the read process (c) with the individual information to be written, wherein if two articles of individual information are coincident with each other, processing on the optical disk is completed and the information obtaining process (a) and the following processes (b), (c), and (d) are iterated on a new optical disk, and if the two articles of individual information are different from each other, the write process (b) and the following processes (c) and (d) are iterated on a new optical disk.

In order to carry out the method, the apparatus comprises:

an information output section for sequentially outputting, to individual optical disks, individual information different from optical disk to optical disk;

a bar code write device for writing a bar code corresponding to the individual information outputted from the information output section into a recording layer within the optical disk with laser beam;

a bar code read device for reading the written individual information of the bar code; and an information comparison section for comparing the individual information read by the bar code read device with the individual information outputted from the information output section.

Individual parts of the constitution are described concretely.

(Optical Disk) The invention is applied to CDs, LDs and other optical disks, as well as the aforementioned DVDs. DVDs are available in two types, one having a single recording layer inside the disk and the other having a plurality of recording layers inside the disk, to either type of which the invention can be applied. Further, optical disks are available in several types, one being for read only, another being additionally writable, another being iteratively rewritable, another having a plurality of these types of sections in combination, and the like, to and type of which the invention can be applied.

In optical disks, object recording information such as image, audio and character information is written. As the recording system for these types of recording information, an ordinary recording system for optical disks may be adopted freely.

(Individual Information)

As stated before, the individual information may be a serial number or identification (ID) code given by consecutive numbers or combinations of codes assigned to individual optical disks, and otherwise, any arbitrary information as required, such as the type and recording system of information previously recorded on optical disks, cryptographic information for prevention of illegal copy, the date of manufacture, the term of validity for use, and the like, which may be used singly or in combination of some plurality.

In addition, particular individual information may be recorded on one optical disk only, or there may be some cases where identical information is recorded on a limited number of optical disks.

(Bar Code)

As the method and rules for converting individual information into pattern information of bar codes, the same techniques as ordinary bar code techniques may be applied. The thickness, width, spacing and the like of bar codes are set depending on the size and placement of the bar code recording area in optical disks, irradiation conditions of the laser beam, characteristics of the recording layer of the optical disk, and other conditions.

Preferably, the bar code is written in the recording layer at an area where original recording information is not described, out of the optical disk. For example, in ordinary optical disks, since recording information is absent in a certain range in proximity to inner radii, the bar code may be recorded on this portion of the recording layer.

(Process for Acquiring Individual Information (a))

The individual information may be registered on a computer or the like that controls or manages the whole recording process of bar codes, or automatically generated by the computer. If necessary, it is also possible for the operator to enter part of the individual information or the whole data into the computer or the like. The individual information to be written may be changed based on the information about the optical disk acquired in a later-described disk information acquiring process.

The individual information is outputted to bar code writing means. Also, the individual information is outputted to bar code reading means and information comparing means as well. The outputted individual information is retained until it becomes unnecessary.

The work of entry, generation, retention, output and the like of individual information is preferably performed by information processing means such as computers.

(Write Process (b))

The individual information outputted from the individual information output section is converted into irradiation patterns or scan patterns of laser beams for making bar codes.

As for the laser beam irradiation equipment, equipment similar to ordinary laser patterning equipment or laser marking equipment may be used. For example, the equipment may be such that it irradiates a pulsed laser beam at an interval pattern corresponding to the interval pattern of the bar code. Controlling the pulse interval of the laser beam according to the individual information allows a bar code representing the object information to be obtained.

The laser beam for making a bar code is applied to the recording layer of the optical disk. When the laser beam is applied to a fixed position with the optical disk held rotating, bar codes are made one by one along a circumferential direction of the optical disk. Alternatively, the position to which the laser beam is applied may be moved and scanned with the optical disk fixed. Wavelength, intensity, focusing position and the like of the laser beam are previously set to conditions under which the thin layer of gold, aluminum or the like forming the recording layer is properly melted to form bar codes. The adjustment and control of the laser beam with an optical system such as lenses and mirrors allows the laser beam to be preferably irradiated in a generally strip shape or generally linear shape corresponding to one bar forming the bar code. Like this, as means for shaping the laser beam into a generally strip-shape or generally linear shape, for example, an optical system utilizing a cylindrical surface lens as disclosed in the optical system disclosed in unexamined Japanese Laid-Open Patent Publication No. 57-94482 may be used.

When the recording layer of the optical disk is provided as a plurality of layers, the bar code may be recorded into either the upper or lower recording layer only, or the same bar code may be written into all the recording layers. Generally, since the recording layer differ in its material or light transmitting and absorbing characteristics, a laser beam matching the characteristics of the recording layer into which bar codes are written is irradiated thereon.

As the method for writing bar codes, in addition to the method by melting and removing the recording layer with a laser beam, it is also possible that a bar code is written by changing the chemical or physical properties of the recording layer with a laser beam and the bar code is read by a read means that can detect differences in such properties. For example, it is possible that a bar code is written by changing the color of the recording layer and the bar code is read by detecting differences in color with a sensor or the like.

(Read Process (c))

Reading of bar codes can be implemented by a reading equipment that utilizes a normal laser beam. More specifically, for example, with an arrangement that a relatively weak laser beam for reading-use is applied to the optical disk and that a laser beam reflected by the recording layer is detectable by an photodetector, there arises differences in reflection characteristics between part at which the metal has been removed in the recording layer and part at which the metal has not been removed in the recording layer, so that moving the laser irradiation point relative to and along the bar code allows bar code information to be read from a detection signal of the photodetector.

The bar code reader may be one that has only one place set as its read area out of the bar code recording area of the optical disk, or otherwise another that has a plurality of read areas set and that reads bar codes separately from the respective read areas. With an arrangement that a plurality of read areas are set at a plurality of places lengthwise of the bars forming a bar code, i.e., at a plurality of places radially of the optical disk, even with defectives that are present only partly in each bar, the bar code can be detected.

(Information Comparison Process (d))

A comparison is made between individual information that has been read and individual information that has come to be written. This comparison can actually be achieved by an information processing device such as a computer.

If the two articles of individual information are coincident with each other, the processing onto the optical disk is ended, where the optical disk is supplied to the succeeding process or processing. Also, the next unprocessed optical disk is prepared and the process is iterated from the process (a).

If the two articles of individual information are different from each other, the optical disk is discarded. When the discarded optical disk can be played, it can also be reused. Further, the next unprocessed optical disk is prepared and the process is iterated from the process (b). That is, by using the individual information acquired at process (a) as it is, the bar code write process (b) is carried out.

By iterating the processes (a) through (d) as described above, optical disks in which object individual information has been additionally written are obtained one after another.

With this method, only optical disks in which object individual information has securely been formed are obtained one after another. Still, there never occurs omission of individual information. Therefore, even if the successively obtained optical disks are fed to the succeeding manufacture processing process as it is, or if fed to shipping and distribution, any disturbance and trouble of management due to omissions of the individual information can be prevented.

(Constitution Execution of Write and Read)

The write process (b), read process (c) and information comparison process (d) can be executed continuously while the optical disk is held rotating. More specifically, with an arrangement that rotation holding means for one optical disk is equipped with both write means and read means, a written bar code is immediately read on the same circumferential track, and the read individual information is compared in information, in order to achieve the continuous operation. At some point on the way to the completion of a bar code write process, read and comparison may be started.

In the information comparison process (d), at the time when the individual information that has been read and the individual information that has come to be written has found to be different from each other, the write process (b) is halted, the optical disk is discarded, and then the process is iterated from the process (b) on the new optical disk. This saves the time of writing a bar code completely on the optical disk when a bar code write fault has occurred. Therefore, an improvement in the efficiency of work and a reduction in the operating cost can be realized.

(Disk Information Acquisition Process (e))

Prior to the write process (b), the method may include a disk information acquisition process (e) for acquiring information about the optical disk.

Information about the optical disk to be acquired is information that can be utilized in the subsequent processes (b), (c), (d). More specifically, it is the information needed to be known before the recording of the bar code, such information as whether or not the optical disk is of single layer recording or multiple layer recording, differences in information recording system, production lot number, date of production, and other information to be determined at the time point of production.

Acquisition means for disk information, although varying depending on the disk information to be acquired, may be, for example, an optical sensor, an electromagnetic sensor or other non-contact type sensor device, or otherwise, may be a device for obtaining information such as configurational structure by mechanical contact with the optical disk.

To obtain information as to whether the optical disk is of single-layer recording or multiple-layer recording as disk information, a sensor means that utilizes a laser beam as in the bar code read means is utilized, by which placement information on the recording layer is obtained from differences in reflected light due to differences in the position or characteristics of the recording layer. The information may also be obtained by detecting differences in the surface color of the optical disk due to differences in the recording layer with a color sensor.

The disk information may also be obtained by utilizing information previously written in the optical disk. For example, the information may be obtained by recording character, symbol or other information at the stage of the production of optical disks by means of printing, separately from the original recording information, and by reading their image and analyzing the read image. It is also possible to read the image or other information itself that has originally been recorded in the optical disk, and to take the readout as the disk information.

(Generation of Information Pulse Train)

The write process (b) may include a process for generating laser beam unit pulses of equal intervals, a process for generating an information pulse train by passing and interrupting the laser beam unit pulses of equal intervals at time intervals corresponding to the bar code of individual information, and a process for writing the bar code into the recording layer by applying the information pulse train onto the optical disk.

The laser beam unit pulses of equal intervals, which have not been transformed into information, can be generated by activating, for example, a Q-switch at a constant frequency. This makes it possible to generate unit pulses which have a narrow pulse width, high energy per pulse, and uniformity and which are thus suited to the melting of the recording layer.

The control of passing and interrupting the unit pulses is implemented by using, for example, a shutter device that utilizes an acousto-optic modulation element or an electrooptical modulation element. If the information pulse train is generated by using the shutter device or the like, an information pulse train comprising unit pulses which are of accurate intervals and sufficient, uniform energy intensity can be obtained. By using such an information pulse train generated from a unit pulse train of equal intervals, bar codes of high precision are made by virtue of uniform energy per pulse.

In addition, the generation of an information pulse train can be implemented also by activating a Q-switch or the like at intervals corresponding to the bar code without generating a unit pulse train of equal intervals. However, in the case, the uniformity in energy per pulse may be difficult to ensure, depending on the type of laser used.

The shutter device may be either incorporated into a laser oscillator together with a Q-switch that generates the unit pulses, or provided outside the laser oscillator.

More specifically, the embodiment of the present invention will be described below with reference to the attached figures.

Figure 2:
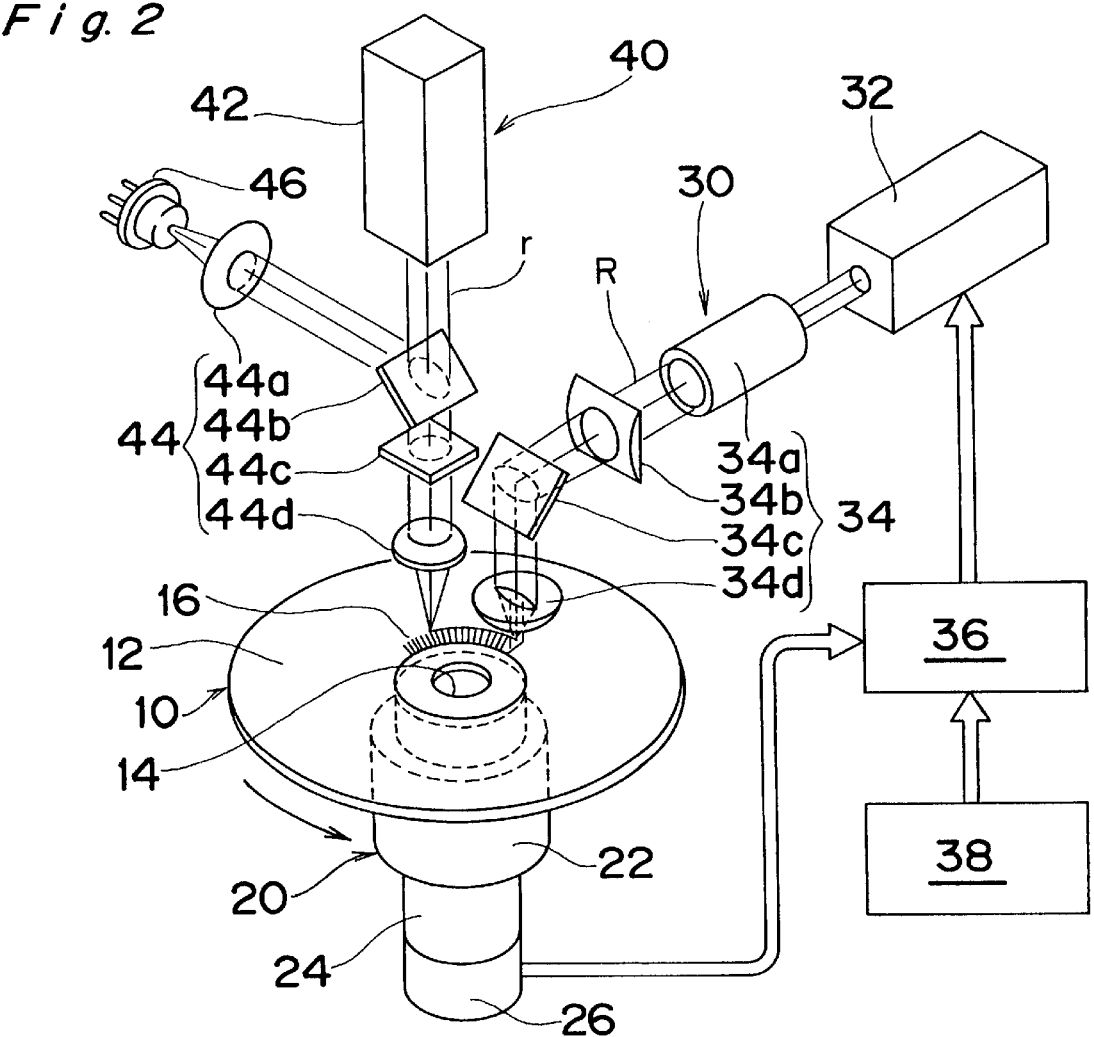
FIG. 2 is a perspective view representing a processing apparatus.

FIG. 2 shows the overall structure of an information processing apparatus of the embodiment, which comprises a rotation holding device 20 for holding an optical disk 10, a bar code writer 30, a bar code reader 40 and the like.

Figure 10:
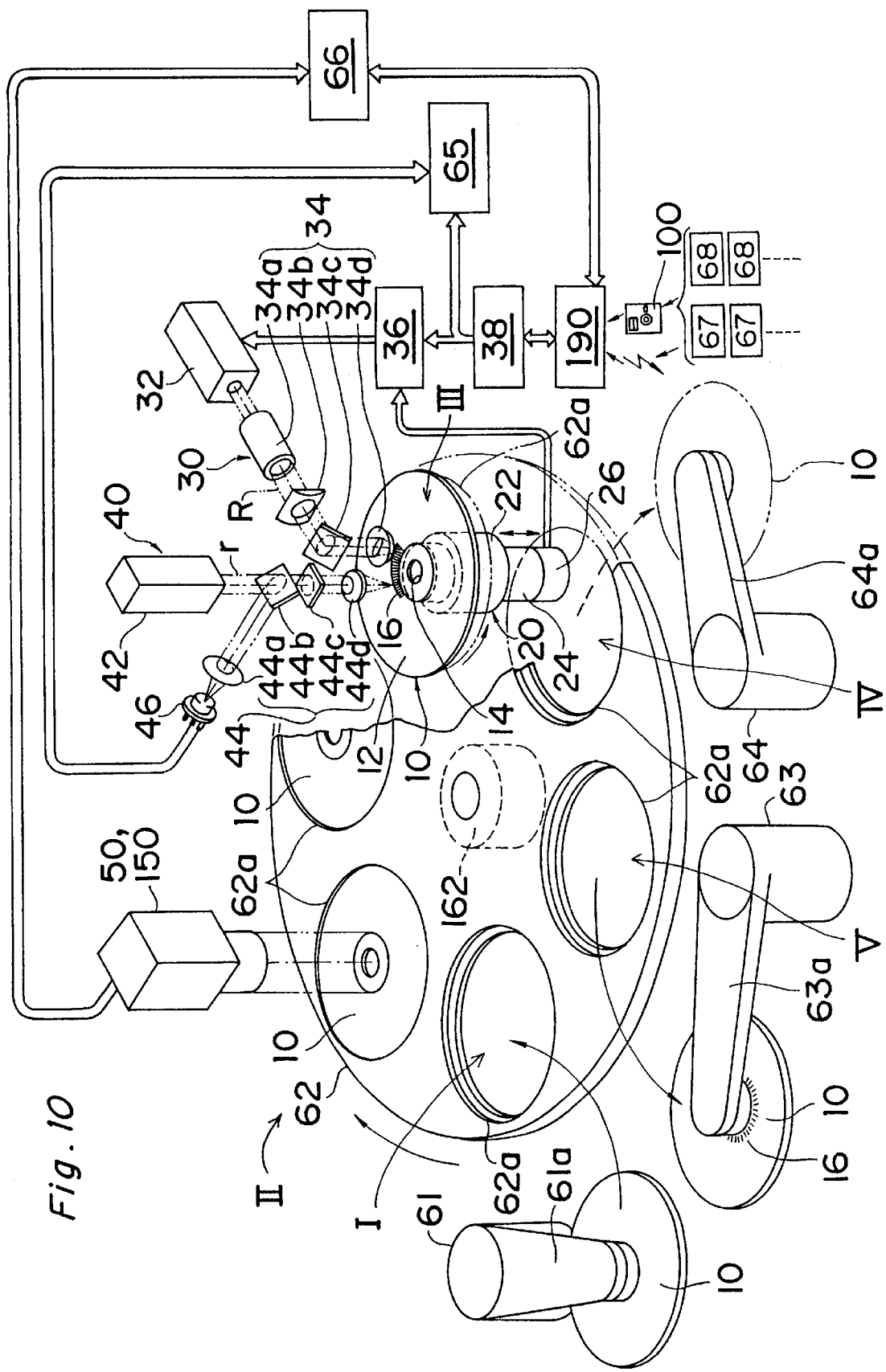
FIG. 10 is a perspective view representing the processing apparatus with a schematic block diagram of other operation sections thereof.
Figure 11:
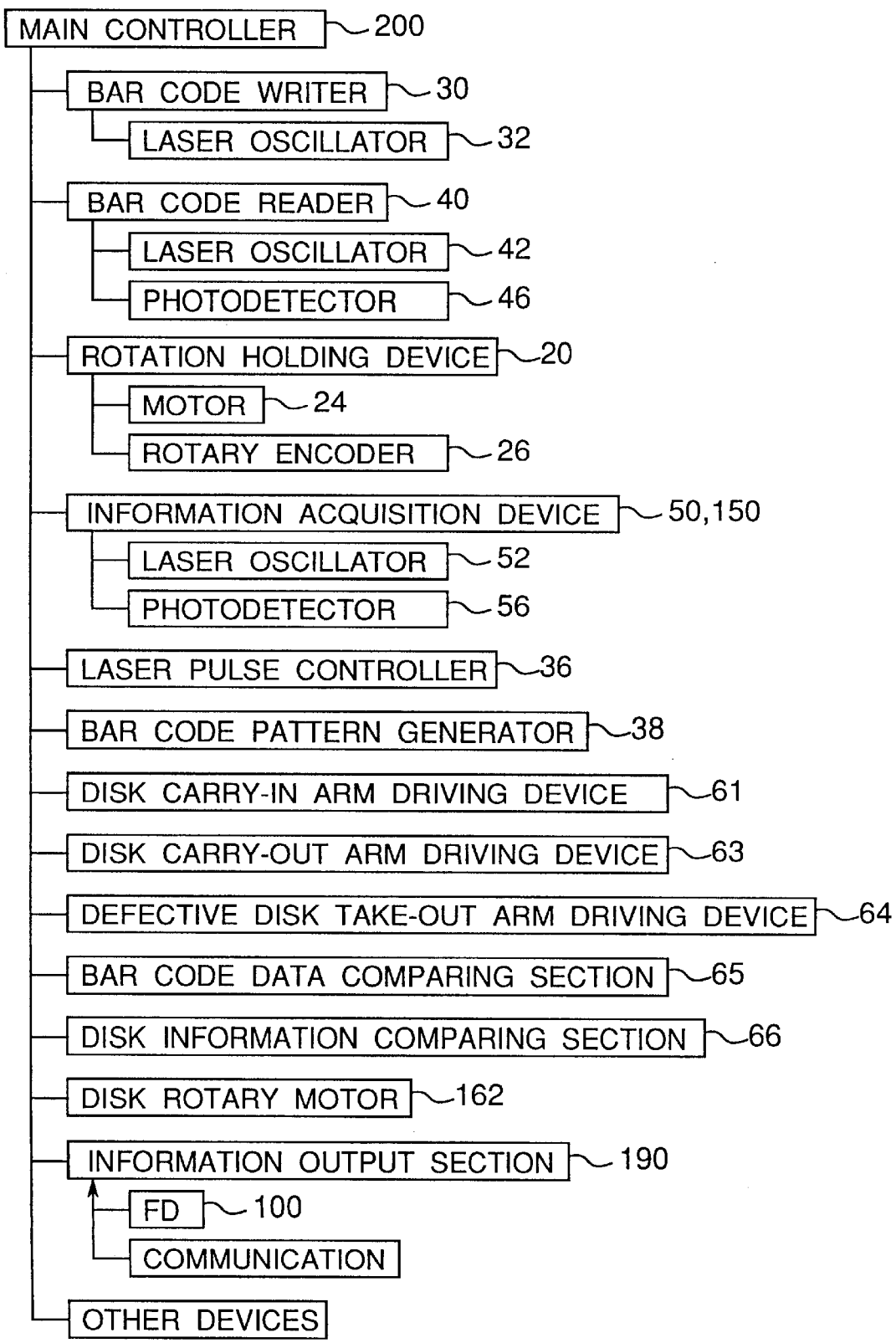
FIG. 11 is a detail block diagram of the processing apparatus.

FIG. 10 is a perspective view representing the processing apparatus with a schematic block diagram of other operation sections thereof, and FIG. 11 is a detail block diagram of the processing apparatus. As compared with the apparatus in FIG. 2 itself, the processing apparatus in FIGS. 10 and 11 comprises other devices for continuous production of optical disks.

The optical disks 10 are held in recesses 62a of a circular plate-shaped disk transfer rotary table 62 intermittently rotated by a disk rotary motor 162. Each of the recesses 62a can be stopped at an optical disk carry-in position I where a new optical disk 10 is carried in the recess 62a by a disk carry-in arm driving device 61, an information acquisition position II where disk information is acquired from the optical disk 10 by the information acquisition device 50, a write and read position III where bar code information is written by the bar code writer 30 and read by the bar code reader 40, a defective disk take-out position IV where a defective optical disk 10 is taken-out from the recess 62a by a defective disk take-out arm driving device 64, and an optical disk carry-out position V where the processed optical disk 10 is carried-out from the recess 62a by a disk carry-out arm driving device 63.

In order to control the operations, a main controller 200 of the apparatus is connected to the driving devices and operation sections such as the bar code writer 30, the bar code reader 40, the rotation holding device 20, information acquisition devices 50 or 150, a laser pulse controller 36, a bar code pattern generator 38, the disk carry-in arm driving device 61, the disk carry-out arm driving device 63, the defective disk take-out arm driving device 64, a bar code data comparing section 65 for comparing the individual information read in the read process with the individual information to be written, a disk information comparing section 66 which can serve as one example of a disk information deciding section for deciding whether or not the individual information is written on the same optical disk in the write process based on the acquired common information, the disk rotary motor 162, and an information output section 190 for sequentially outputting, to individual optical disks 10, individual information 67 different from optical disk to optical disk 10 in addition to the disk information (common information) 68 which is common on plural optical disks. The information output section 190 has a driver accommodating storage medium such as a floppy disk (FD) 100 to receive information data form the FD 100 and/or receives information data from external sources or database through communication.

At the above positions of the rotary table 62, the following operations are performed schematically, which are described later in detail.

At the optical disk carry-in position I of the rotary table 62, under the control of the main controller 200, the optical disk 10 is carried in one of the recesses 62a of the rotary table 62 by a disk carry-in arm driving device 61 while the optical disk 10 is sucked by an end of the arm portion 61a of the disk carry-in arm driving device 61. Then, the carried-in optical disk 10 is transferred to the information acquisition position II of the rotary table 62 in accordance with the intermittent rotation of the rotary table 62 under the control of the main controller 200.

Figure 7:
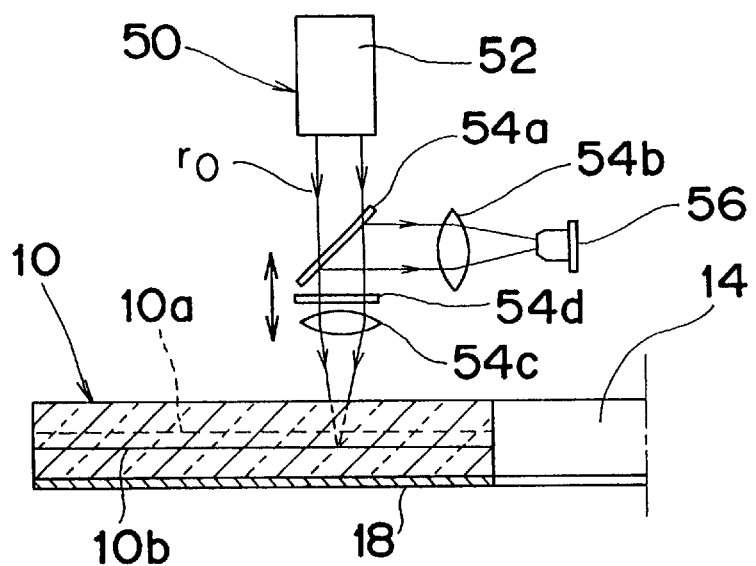
FIG. 7 is a schematic sectional view representing a disk information acquiring process.

At the information acquisition position II, under the control of the main controller 200, the information acquisition device, for example, 50 as shown in FIG. 7 detects whether or not the recording layer of the optical disk 10 is a single layer or multiple layers. That is, disk information (common information) acquired from the optical disk 10 by the information acquisition device 50 is compared with information outputted from the information output section 190 by the disk information comparing section 66 under the control of the main controller 200. The later-described information acquisition device 150 in FIG. 8 can be used instead of the device 50 as shown in FIG. 7. If it is decided by the disk information comparing section 66 that the disk information is not coincident with the information from the information output section 190, the optical disk 10 bypasses the write and read position III and the defective optical disk 10 is taken out at the defective disk take-out position IV by the defective disk take-out arm driving device 64 under the control of the main controller 200. If it is decided by the disk information comparing section 66 that the disk information is coincident with the information from the information output section 190, the bar code 16 is written on the defective optical disk 10 by the bar code writer 30 and read by the bar code reader 40 at the write and read position III under the control of the main controller 200.

At the write and read position III, under the control of the main controller 200, the individual information of the written bar code 16 read by the bar code reader 40 is compared with the individual information to be written which is outputted from the information output section 190 by the bar code data comparing section 65. If it is decided by the bar code data comparing section 65 that two articles of individual information are coincident with each other, under the control of the main controller 200, processing on the optical disk is completed and transferred to the disk carry-out position I through the position IV and to position V in accordance with the intermittent (60 degrees) rotation of the rotary table 62. If it is decided by the bar code data comparing section 65 that the two articles of individual information are different from each other, under the control of the main controller 200, the optical disk 10 is defective and is taken out at the defective disk take-out position IV by the defective disk take-out arm driving device 64. At this time, the bar code information which has been written on the above defective optical disk 10 is held and is written on a new optical disk 10 after the intermittent rotation of the rotary table 62.

At the optical disk carry-out position V, under the control of the main controller 200, the processed optical disk 10 on which the bar code has been written is carried out from the recess 62a of the rotary table 62 by the disk carry-out arm driving device 63.

The above operations at the individual positions are described below in detail.

(Optical Disk)

The optical disk 10 has an information recording area 12 into which recording information with a pit pattern is previously written, where a hole 14 for holding-use is provided in its center. Out of the information recording area 12, inner circumferential portion close to the hole 14 has no information recorded.

Figure 3:
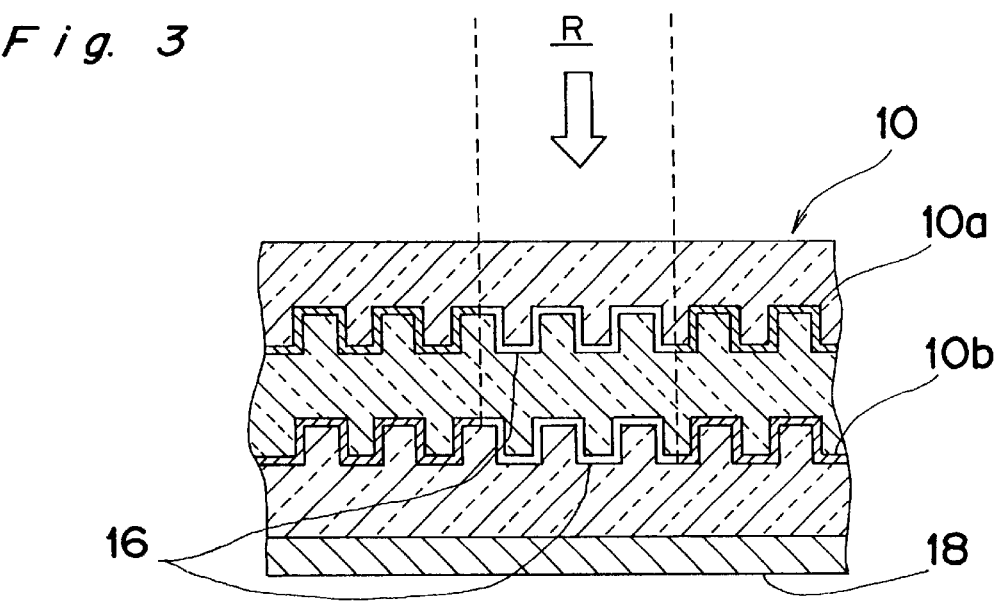
FIG. 3 is a schematic sectional view for explaining the bar code write process.

As detailed in FIG. 3, the optical disk 10 is made of a transparent synthetic resin on the whole, and has upper-and-lower two-layered recording layers 10a, 10b having therein a depressed and projected shape in correspondence to pits and projections of a pit pattern. The upper recording layer 10a employs a gold thin film having an optical reflectance of about 30%, while the lower recording layer 10b employs an aluminum thin film having an optical reflectance of about 100%. Different articles of information are recorded in the upper and lower recording layer 10a, 10b, respectively. The optical disk 10 is transparent on its surface side, allowing transmitting of a laser beam and the like. A print layer 18 is placed on the rear surface side of the optical disk 10.

(Rotation Holding Device)

At the write and read position III, an optical disk holding-part of the rotation holding device 20 is moved up to come in contact with the optical disk 10 and the optical disk 10 is rotated while being held to the rotation holding device 20 by a up-and-down driving motor thereof. The rotation holding device 20 comprises a turntable 22 for holding and rotating the optical disk 10 placed thereon, a motor 24 for driving the rotation of the turntable 22, and a rotary encoder 20 for detecting the rotation of the motor 24. After the operation at the write and read Position III is completed. The optical disk holding-part of the rotation holding device 20 is moved down to separate from the optical disk 10 so as not to prevent the rotary table 62 from rotating.

Above the rotation holding device 20, are placed a bar code writer 30 and a bar code reader 40.

(Bar Code Writer)

The bar code writer 30 comprises a laser oscillator 32 for emitting a YAG laser beam R with wavelength of about 1.06

μm for bar code write use, and an optical system 34 for optically controlling the emitted laser beam R so that the laser beam R is applied onto the optical disk 10. The optical system 34 is composed of a beam expander 34a, a cylindrical surface lens 34b, a mirror 34c and a condenser lens 34d. The laser beam R applied onto the optical disk 10 through such an optical system 34 has a cross section formed into an elliptical, generally strip shape elongated radially with the optical disk 10.

At the write and read position III, as shown in FIG. 3, the laser beam R irradiated from above the optical disk 10 passes through the resin portion, and part of the laser beam R is absorbed by the upper recording layer 10a while the remainder is absorbed by the lower recording layer 10b. As a result, metallic thin films constituting the two recording layers 10a, 10b are melted arid removed, respectively. The upper recording layers 10a, 10b are removed only at a portion corresponding to the cross-sectional shape of the laser beam R.

The bar code pattern generator 38 and the laser pulse controller 36 are connected to the laser oscillator 32 of the bar code writer 30 via the main controller 200 as show in FIG. 11. The bar code pattern generator 38 receives individual information to be written generated by a computer or the like from the information output section 190, and converts the individual information into pulse pattern information for controlling the laser beam. As rotational angle information of the optical disk 10 obtained from the rotary encoder 26 of the rotation holding device 20 is inputted to the laser pulse controller 36 via the main controller 200, the rate or interval of the pulse pattern transmitted from the bar code pattern generator 38 to the laser oscillator 32 is synchronized with the rotation of the optical disk 10 by the main controller 200. At a result of this, a bar code 16 of accurate intervals can be written.

Figure 4:
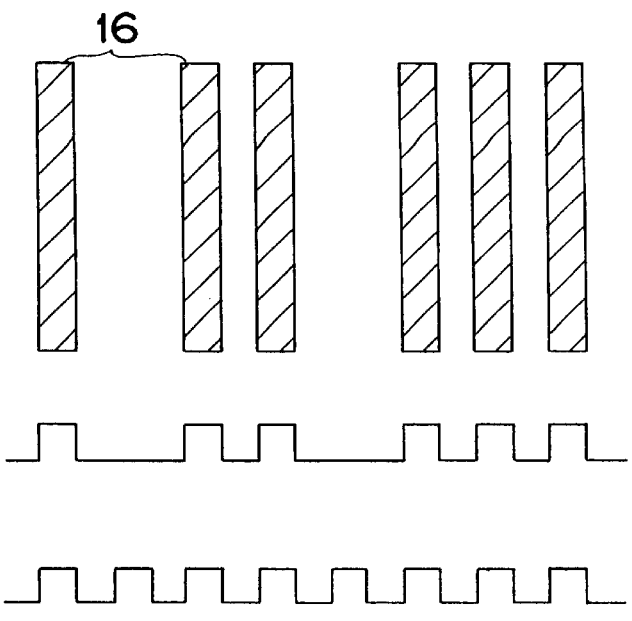
FIG. 4 is a schematic explanatory view representing the relationship between bar code and laser beam pulses.

As shown in FIG. 4, the laser oscillator 32 converts the continuously oscillated laser beam R into a unit pulses $P_0$ of equal intervals arid constant energy intensity by means of so-called Q-switch or the like. For writing of the bar code, high-energy laser pulses need to be irradiated in a very short time so that heat is not transferred to the resin material or non-irradiated area. Using the Q-switch makes it possible to generate unit pulses suitable for bar code write, short in pulse width and high in energy per pulse. Shortened intervals of the unit pulses, i.e., shortened activation intervals of the Q-switch would in general result in lowered energy per pulse, but the uniformity in energy per pulse will never be lost as far as equal intervals, i.e., constant frequency is maintained. Therefore, increasing the laser output makes it possible to generate unit pulses having enough energy per pulse and uniformity even with higher frequencies.

By controlling the unit pulses $P_0$ for their passage and interrupt with another shutter means that is incorporated into the laser oscillator 32 and that utilizes an acousto-optic modulation element or an electrooptical modulation element, an information pulse train $P_1$ in a state that part of the unit pulses $P_0$ is removed is obtained. The activation of the shutter means that generates the information pulse train $P_1$ is controlled by the bar code pattern generator 38 and the laser pulse controller 36. By irradiating a laser beam R comprising the information pulse train $P_1$, the bar code 16 of intervals corresponding to the Information pulse train $P_1$ is made.

As shown above, when the method in which the unit pulse $P_0$ of equal intervals are converted into the information pulse train $P_1$ with the shutter means is adopted, an information pulse train $P_1$ having accurately set intervals, high precision and uniform energy per pulse can be obtained so that a correct, high-precision bar code 16 can be written. Particularly, in a desire to improve the productivity by increasing the rotating speed of the optical disk 10 or to increasing the amount of information by increasing the density of the bar code 16, the above method by which a high-precision, uniform and high-energy-intensity information pulse train $P_1$ can be obtained is useful.

As shown in FIG. 2, the bar code 16 is formed in a strip shape along an inner circumference of the optical disk 10. Individual lines of the bar code 16 are arranged radially along radii of the optical disk 10.

In addition, although a YAG laser having a wavelength of about 1.06 μm has been used in the bar code writer, it is also possible to a laser beam of different wavelengths or kinds as far as it has characteristics suited to bar code writing. Also, the optical system for shaping the laser beam into a generally strip form may be implemented by an optical system in which a different number of optical elements such as lenses and mirrors, or in which a mask having a rectangular opening or a slit that restricts the longer side or shorter side of a generally rectangular opening is provided, in addition to that shown in FIG. 2. Further, in combination with $YVO_4$ laser or the like that causes less change in energy per pulse even if the interval of activation of the Q-switch is changed, the means for generating the information pulse train may adopt a method in which an information pulse train is directly generated by controlling the activation of the Q-switch with the bar code pattern generator 38 and the laser pulse controller 36 without generating the unit pulse train and which does not use an additional shutter means.

(Bar Code Reader)

The bar code reader 40 has a laser oscillator 42, an optical system 44 and a photodetector 46. The laser oscillator 42 irradiates downward vertically a laser beam r which is weaker in energy than the bar code writer 30 and which has such a wavelength as to be likely to be reflected by the metallic thin film. At the write and read position III, the laser beam r is applied to the bar code 16 formed in the optical disk 10 through a polarization beam splitter 44b, a λ/4 plate 44c and an image-forming lens 44d that constitute the optical system 44.

The polarization of the laser beam r is such a linear polarization, just after the outgoing of the laser oscillator 42, that the laser beam r passes through the polarization beam splitter 44b, and turns to circular polarization after the passage of the λ/4 plate 44c. The laser beam r reflected by the bar code 16 is brought into a linearly polarized state in which the polarization axis is perpendicular to that of the first linear polarization, by passing through the image-forming lens 44d and the λ/4 plate 44c, and is reflected horizontally by the polarization beam splitter 44b, passing through a condenser lens 44a and entering the photodetector 46. The bar code 16 comprises one part where the metallic thin films of the recording layers 10a, 10b are removed not to reflect the laser beam r and the other part where the metallic thin films are left to reflect the laser beam r. Since the laser beam r is condensed into a shape with small enough cross section by the image-forming lens 44d, a signal that varies in intensity responsive to the pattern of the bar code 16 in accordance with the rotation of the optical disk 10 is detected by the photodetector 46, so that individual information contained in the bar code 16 is read.

In addition, the bar code reader, without being limited to the above, may also be another in which a beam is applied to the bar code and the resulting reflected light or transmitted light is detected.

(Disk Information Acquiring Means)

Figure 8:
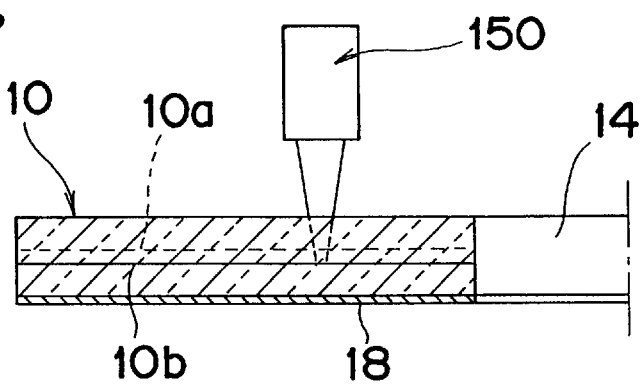
FIG. 8 is a schematic sectional view representing another disk information acquiring process.
Figure 9:
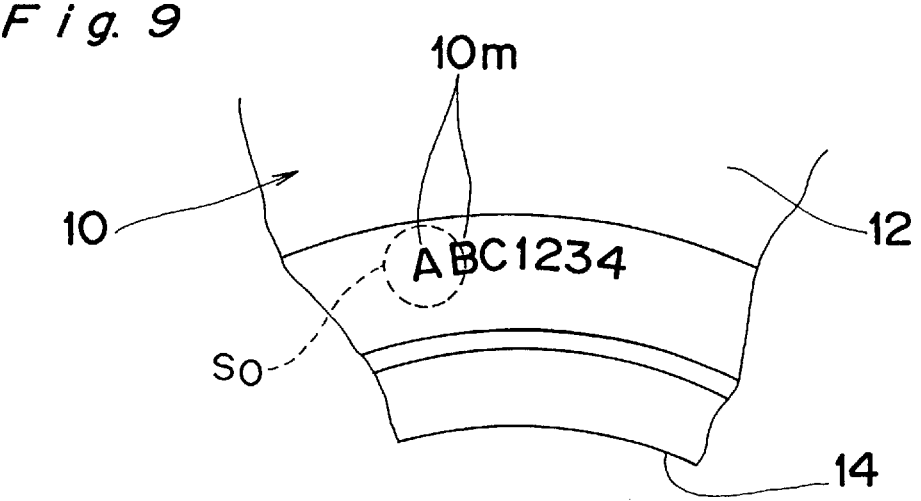
FIG. 9 is a main-part plan view of an optical disk for explaining another disk information acquiring process.

FIGS. 7 to 9 show means for performing disk information acquisition with the optical disk 10 before the writing of the bar code.

At the information acquisition position II, the information acquisition device 50 as shown in FIG. 7 detects whether or not the recording layer of the optical disk 10 is a single layer or multiple layers. The information acquisition device 50 being similar in basic constitution to the aforementioned bar code reader, a laser beam $r_0$ emitted form a laser oscillator 52 in a linearly polarized state passes through a polarization beam splitter 54a, and is circularly polarized by a $\lambda/4$ plate 54d, applied to the optical disk 10 via an image-forming lens 54c, and reflected by the recording layer 10a or 10b. The reflected light is turned into a linearly polarized state in which the polarization axis is perpendicular to that of the first linear polarization, by passing through the image-forming lens 54c and the $\lambda/4$ plate 54d, and is reflected by the polarization beam splitter 54a and detected by a photo-detector 56 via a condenser lens 54b. By detecting the characteristics of the reflected light that vary depending on the material or position of the recording layers 10a, 10b which is obtained from the information output section 190, it can be determined at the disk information comparing section 66 whether or not this optical disk 10 is the single layer recording type or the multiple layer recording type. Based on its result, write conditions such as the energy of the laser beam in writing the bar code, the focal position, and the like can be set to optimum ones. Also, when the individual information to be written by the bar code is information at the disk information comparing section 66 whether or not the optical disk 10 to be processed actually is an optical disk 10 of the single layer recording type. If it is an optical disk 10 of any different type, then the processing can be stopped by the main controller 200 so that occurrence of a defective product can be prevented.

For the determination between the single layer recording type and the multiple layer recording type, the following method can be adopted. The focal position of the laser beam $r_0$ to be applied from the information acquisition device 50 to the optical disk 10 is changed up and down. If the intensity of the reflected light detected by the photodector 56 when the focal position of the laser beam $r_0$ comes to a position where the recording layer 10a or 10b should be present becomes a maximum, it can be seen that the recording layer 10a or 10b is present at the position. The focal position of the laser beam $r_o$ can be moved up and down by moving the optical system including the image-forming lens 54c and the like or by moving the optical disk 10 up and down. It is also possible to detect the recording layers 10a, 10b by applying laser beams $r_0$ of different characteristics in accordance with the materials of the recording layers 10a, 10b.

The information acquisition device 150 shown in FIG. 8 is a color discrimination sensor. When the surface of the optical disk 10 is measured by the color discrimination sensor 150, there arises a difference in measured surface color between the recording layer 10a made of gold and the recording layer 10b made of aluminum. Thus, it becomes possible to discriminate the presence of the recording layers 10a, 10b, from information about the surface color obtained by the color discrimination sensor 150.

In the information acquisition method as shown in FIG. 9, an information expression 10m by means of characters, symbols or numerals is described at a place other than the information recording area 12, e.g., an inner circumferential portion, of the optical disk 10. This information expression 10m expresses the type of single layer recording type or multiple layer recording type, recording system, production lot number, or other information determined at the time of manufacture. However, the information expression 10m is implemented by means of printing or printout, molding, etching or the like as an expression common to all the optical disks 10 of, for example, one lot, and does not include the aforementioned individual information.

An image of the information expression 10m is picked up by an image receiving devices such as CCDs connected to the main controller 200, and the image is analyzed, by which the characters or symbols of the information expression 10m are read. If the optical disk 10 is rotated so that an image-receiving area $S_0$ of the image receiving device is moved circumferentially, the information expression 10m can be read one by one. In addition, it is also possible that with the image receiving device placed so that the image receiving area includes the whole area where the information expression 10m is placed, the entire information 10m can be read at once.

As the disk information acquisition mens, besides the above embodiment, it is also possible to use a method in which information such as the type of optical disks is previously recorded in the optical disks in the same recording form as ordinary recording information and the information is acquired by using an ordinary player or part of it, or a method in which the area where the reflecting film is formed is varied in size from recording layer to recording layer of the optical disk and the differences of size are utilized, or a method in which the information expression 10m in FIG. 9 is expressed in the form of bar codes instead of characters and symbols and the bar codes are read. These techniques are disclosed in Unexamined Japanese Laid-Open Patent Publications No. 9-50649 or No. 9-7288.

With the use of the information acquisition means as described above, by obtaining the information form the optical disk 10, processing conditions for subsequent processes such as the bar code write process and the bar code read process can be set appropriately. Also, by deciding whether or not an optical disk 10 to which individual information is to be written is proper, it can be prevented that individual information is written into a wrong optical disk 10.

(Bar Code Additionally Writing Method)

FIG. 1 shows the method of additionally recording information by using the information recording apparatus in the sequence of processes.

Information such as images and voices are previously recorded in the optical disk 10. Individual information data $d_1$, $d_2$, . . . to be additionally recorded by bar code on the optical disk 10 are previously generated and stored in order by an information processing device such as a computer. First, leading data $d_1$ to be additionally recorded on the coming optical disk 10 is picked up.

The optical disk 10 is first fed to the disk information acquiring process at the write and read position III. The result of this disk information acquisition is fed to the bar code write process and moreover compared with the individual information data $d_1$ by the main controller 200, by which it is decided at the disk information comparing section 66 whether or not the optical disk 10 is an optical disk 10 to which the individual information data $d_1$ should be written. If it is an improper optical disk 10, then the processing is stopped with an alarm generated by the main controller 200, and the optical disk 10 is exchanged with a new optical disk 10 at the defective disk take-out position IV and the optical disk carry-out position V by the defective disk take-out arm driving device 64 and the disk carry-out arm driving device 63 under the control of the main controller 200.

If the optical disk 10 is a proper optical disk 10, the processing moves to the next bar code write process by the main controller 200. In the bar code write process at the write and read position III, the individual information data $d_1$ is converted into a bar code, which is written into the recording layer 10b of the optical disk 10. In this process, the bar code write is performed based on the information of the optical disk 10 such as a state of the recording layer measured in the disk information acquisition process.

The optical disk 10 in which the bar code 16 of individual information has been written is fed to the bard code inspection process at the write and read position III. In the bar code inspection process, the individual information read from the written bar code 16 is compared with the individual information data $d_1$ at the write and read position III.

If the two articles of individual information are coincident with each other, this optical disk 10 is judged as a good product by the bar code data comparing section 65, and the additional information recording is completed. The individual information $d_1$ stored in the computer or the like is treated as completely additionally recorded information, and the next individual information $d_2$ is taken out from the information output section 190 under the control of the main controller 200.

If the two articles of individual information are determined as not coincident with each other by the bar code data comparing section 65, this optical disk 10 is determined to be a defective product by the main controller 200. The optical disk 10 that has found to be a defective product is discarded at the defective disk take-out position IV by the defective disk take-out arm driving device 64 because it is normally difficult to correct or reproduce the bar code. With the optical disk 10 discarded, the individual information $d_1$ is not fed to the process of completion of additional recording, but placed again in a standby state by the main controller 200.

A new optical disk 10 is prepared at the optical disk carry-in position I by the disk carry-in arm driving device 61, and the sequence from the disk information acquisition process to the bar code write process is performed at the write and read position III. The individual information data to be written in these processes is new individual information data $d_2$ form the information output section 190 if the foregoing optical disk 10 is a good product, and the former individual information $d_1$ if the foregoing optical disk 10 is a defective product.

By iterating these processes, individual information $d_1$, $d_2$, $d_3$ are properly written in order on the optical disk 10 which are completely processed as good products. Thus, there occurs no unused numbers or omissions of individual information data $d_1$ . . . .

(Write and Read Sequential Processing)

The processing of FIG. 1 is performed with the apparatus of FIG. 2.

The optical disk 10 is held by the rotation holding device 20 and rotated at the write and read position III. The optical disk 10 may be one on which disk information acquisition has previously been done, or otherwise disk information acquisition may be done on the optical disk 10 held by the rotation holding device 20.

By the bar code writer 30, the bar code 16 corresponding to the individual information data $d_1$ is written into the optical disk 10 at the write and read position III.

At the write and read position III, the written bar code 16 is read at once by the bar code reader 40 in which the read position is set on the same circumferential position as the write position of the bar code writer 30. The read individual information and the individual information data $d_1$ are compared with each other, by which accuracy between information is judged. In this process, the write of the bar code 16 by the bar code writer 30 is continuously performed.

If the read individual information and the individual information data $d_1$ are different from each other and the information additional recording has been determined to be a failure by the bar code data comparing section 65, then the activation of the bar code writer 30 is stopped at that point by the main controller 200, and the writing of the bar code 16 is ended by the main controller 200. If a write fault is present at even one place in the bar code 16, then the optical disk 10 results in a defective product.

A defective product of optical disk 10 is discarded at the defective disk take-out position IV and a new optical disk 10 is fed to the rotation holding device 20 at the optical disk carry-in position I.

In this method, under the control of the main controller 200, if a write fault of bar codes is discovered, the work can be stopped just after the bar code has been written into the optical disk 10, or even during the write process. Therefore, the time and labor for performing the further processing processes on the defective optical disk 10 can be saved.

Also, under the control of the main controller 200, a new write process on the new optical disk 10 may be performed by using the individual information data $d_1$ during the write process as it is. Therefore, it is easy to manage or handle the individual information data $d_1$.

Further, when bar code write and bar code read are continuously performed on the same rotation holding device 20, it becomes unnecessary to use rotation holding device 20 separately between the bar code write process and the bar code read process. Therefore, a simplification of the apparatus and a reduction in the apparatus space can be realized.

(Another Embodiment)

Figure 5:
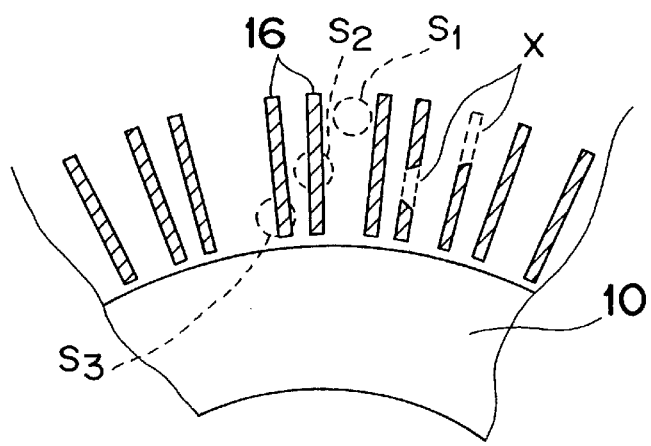
FIG. 5 is a schematic plan view representing a bar code read process.
Figure 6:
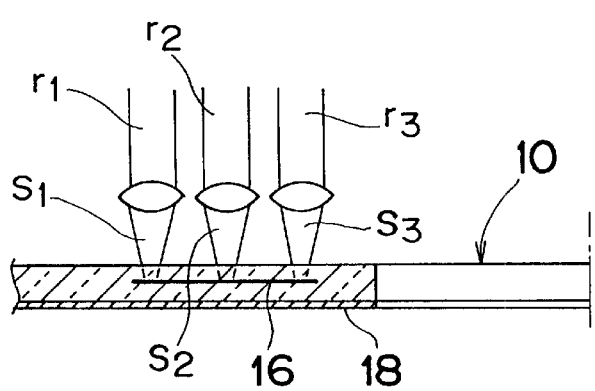
FIG. 6 is a schematic sectional view representing the bar code read process.

FIGS. 5 and 6 show another embodiment of the bar code read device.

Principally, the same bar code reader 40 as in the foregoing case is used, but bar code read areas $S_1$ to $S_3$ are set at a plurality of places lengthwise of each bar of the bar code 16, i.e., three different places in the radial direction of the optical disk 10.

Laser beams $r_1$ to $r_3$ for read-use are applied to the read areas $S_1$ to $S_3$, respectively, to read the bard code 16. If each data of individual information read at the three places is coincident with individual information data to be written, then the bar code 16 is proper and the optical disk 10 is judged to be a good product. If any of the three kinds of individual information is different from the individual information data, then the optical disk 10 is judged to be a defective product because the bar code 16 may be misread.

With the adoption of this method, even when the bar code 16 is only partly defective, the determination of a defective product can be made securely. For example, as shown in FIG. 5, when a defect x is present at a one-side end portion or some midpoint portion of the bar code 16, there are some cases where the defect x cannot be discovered depending on the position at which the laser beam r for read-use is applied. However, the defect x can be discovered without fail when the read areas $S_1$ to $S_3$ of three places are combined together.

Although the read areas for the bar code 16 have been set at the three places in this embodiment, it is needless to say that the invention can be embodied also at two places or four or more places.

Further, the read areas may also be added slightly outside or inside the radius at which the bar code should be present, in which case by determining the product is a defective one at a time point when some signal is detected, not only a defect of the bar code, but also faulty radial sizes of optical disk can be discovered.

(Other Embodiments)

In the foregoing embodiment of FIG. 2, the bard code writer 30 and the bar code reader 40 are installed above one rotation holding device 20 so that continuous processing is enabled. However, it is also possible to implement write and read operations with separate equipment and processes by separately using a bar code write device equipped with the bard code writer 30 and a rotation holding device 20, and a bar code read device equipped with the bar code reader 40 and another rotation holding device 20.

With the method and apparatus for recording information onto optical disks according to the present invention, it is enabled to additionally record individual information reliably and correctly onto optical disks, thus facilitating the management of production or marketing and distribution based on the individual information.

The entire disclosure of Japanese Patent Application No. 9-91931 filed on Apr. 10, 1997, including specification, claims, drawings, and summary are incorporated herein by reference in its entirety.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A method for recording, onto an optical disk, individual information different from optical disk to optical disk, said method comprising:

obtaining individual information to be recorded onto an optical disk;

writing a bar code corresponding to the individual information into a recording layer within the optical disk with a laser beam;

reading the individual information of the bar code written in said writing of the bar code;

comparing the individual information read in said reading of the individual information with the individual information obtained in said obtaining of the individual information, wherein said reading and said comparing are performed during said writing;

if the individual information read in said reading is coincident to the individual information obtained in said obtaining, then:

repeating said obtaining with new individual information to be recorded onto another optical disk;

repeating said writing of a new bar code corresponding to the new individual information into a recording layer within the other optical disk with the laser beam;

repeating said reading of the new individual information of the new bar code written in said writing of the new bar code; and repeating said comparing of the new individual information read in said reading of the new individual information with the new individual information obtained in said obtaining, wherein said reading and said comparing are performed during said writing;

if the individual information read in said reading is not coincident to the individual information obtained in said obtaining, then:

stopping said writing of the bar code corresponding to the individual information into the recording layer within the optical disk with the laser beam;

repeating said writing of the bar code corresponding to the individual information into the recording layer within the other optical disk with the laser beam;

repeating said reading of the individual information of the bar code written in said writing of the bar code; and repeating said comparing of the individual information read in said reading of the individual information with the individual information obtained in said obtaining, wherein said reading and said comparing are performed during said writing; and holding and rotating the optical disk and the other optical disk while said writing, said reading, and said comparing are performed, wherein said reading comprises reading the bar code at a plurality of places lengthwise of each of the bars constituting the bar code; and said comparing comprises comparing the individual information read at the plurality of places and the individual information obtained in said obtaining of the individual information.

2. A method according to claim 1, further comprising:

acquiring common information from the optical disk or the other optical disk to have said writing performed thereon, the common information being common on a plurality of optical disks; and deciding whether the individual information is to be written on the same optical disk in said writing based on the acquired common information.

3. An apparatus for recording, onto an optical disk, individual information different from optical disk to optical disk, said apparatus comprising:

a rotation holding device operable to hold and rotate an optical disk;

an information output section operable to sequentially output to individual optical disks, individual information that differs from optical disk to optical disk;

a bar code write device operable to write a bar code corresponding to the individual information outputted from said information output section into a recording layer within the optical disk with a laser beam;

a bar code read device operable to read the individual information of the bar code;

an information comparison section operable to compare the individual information read by said bar code read device with the individual information outputted from said information output section, wherein said bar code read device and said information comparison section are operable while said bar code write device is operable and if said information comparison section determines that the individual information read by said bar code read device differs from the individual information outputted from said information output section at a point in time, said bar code write device is stopped, wherein said bar code read device is operable to read bar code read areas set to plurality of places lengthwise of each of the individual bars constituting the bar code.

4. An apparatus according to claim 3, further comprising:

a disk information acquisition device operable to acquire common information from the optical disk to be written thereon, the common information being common on a plurality of disks; and a disk information deciding section operable to decide whether the individual information should be written on the optical disk based on the common information.

* * * * *